US011924692B2

United States Patent
Sarkis et al.

(10) Patent No.: US 11,924,692 B2
(45) Date of Patent: Mar. 5, 2024

(54) RESERVED RESOURCE INDICATION FOR SIDELINK

(71) Applicant: QUALCOMM Incorporated, San Diego, CA (US)

(72) Inventors: Gabi Sarkis, San Diego, CA (US); Kapil Gulati, Belle Mead, NJ (US); Tien Viet Nguyen, Bridgewater, NJ (US); Shuanshuan Wu, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 17/302,735

(22) Filed: May 11, 2021

(65) Prior Publication Data

US 2021/0360484 A1 Nov. 18, 2021

Related U.S. Application Data

(60) Provisional application No. 63/023,508, filed on May 12, 2020.

(51) Int. Cl.
*H04W 28/26* (2009.01)
*H04W 72/02* (2009.01)
*H04W 72/20* (2023.01)
*H04W 72/56* (2023.01)

(52) U.S. Cl.
CPC .......... *H04W 28/26* (2013.01); *H04W 72/02* (2013.01); *H04W 72/20* (2023.01); *H04W 72/56* (2023.01)

(58) Field of Classification Search
CPC ..... H04W 28/26; H04W 72/56; H04W 72/20; H04W 72/02
See application file for complete search history.

(56) References Cited

U.S. PATENT DOCUMENTS

| | | | | |
|---|---|---|---|---|
| 2020/0220694 | A1* | 7/2020 | Khoryaev | H04L 1/1816 |
| 2020/0336253 | A1* | 10/2020 | He | H04W 4/40 |
| 2021/0144750 | A1* | 5/2021 | Cao | H04W 72/0453 |
| 2021/0266885 | A1* | 8/2021 | Sarkis | H04W 72/20 |
| 2022/0256553 | A1* | 8/2022 | Lin | H04W 72/566 |
| 2022/0279536 | A1* | 9/2022 | Khsiba | H04W 72/1263 |

(Continued)

OTHER PUBLICATIONS

Intel Corporation: "Resource Allocation Schemes for Nr V2X Communication", R1-1902484, 3GPP TSG RAN WG1 Meeting #96, Athens, Greece, Feb. 25-Mar. 1, 2019, Feb. 16, 2019 (Feb. 16, 2019), pp. 1-17, XP051600180, Retrieved from the Internet: URL: http://www.3gpp.org/ftp/tsg%5Fran/WG1%5FRL1/TSGR1%5F96/Docs/R1%2D1902484%2Ezip. [Retrieved on Feb. 16, 2019] section: 2.1, p. 2-p. 5 sections: 2.2. 3. 4, p. 6-p. 7.

(Continued)

*Primary Examiner* — Ajay Cattungal
(74) *Attorney, Agent, or Firm* — Harrity & Harrity, LLP

(57) ABSTRACT

Various aspects of the present disclosure generally relate to wireless communication. In some aspects, a user equipment (UE) may transmit a reservation for a sidelink resource for a communication by the UE, wherein the sidelink resource was previously reserved by a transmitter UE for a communication by the transmitter UE; and receive an indication that the sidelink resource is reserved and that the UE is not permitted to reserve the sidelink resource. Numerous other aspects are provided.

29 Claims, 7 Drawing Sheets

(56) References Cited

U.S. PATENT DOCUMENTS

2023/0064256 A1\* 3/2023 Ryu ..................... H04W 72/02

OTHER PUBLICATIONS

Intel Corporation: "Summary for AI 7.2.4.2.2 Mode-2 Resource Allocation", 3GPP TSG RAN WG1 Meeting #96bis, 3GPP Draft, R1-1905717, Summary of 5G V2X Mode 2 V2, 3rd Generation Partnership Project (3GPP), Mobile Competence Centre; 650, Route Des Lucioles, F-06921 Sophia-Antipolis Cedex, France, vol. RAN WG1, No. Xian, China, Apr. 8, 2019-Apr. 12, 2019, Apr. 9, 2019 (Apr. 9, 2019), 21 Pages, XP051707775, Retrieved from the Internet: URL: http://www.3gpp.org/ftp/tsg%5Fran/WG1%5FRL1/TSGR1%5F96b/Docs/R1%2D1905717%2Ezip. [Retrieved on Apr. 9, 2019] Aspect 3.2, Aspect 6, Aspect 7.
International Search Report and Written Opinion—PCT/US2021/070541—ISA/EPO—dated Sep. 13, 2021.
Zte, et al., "Mode 2 Resource Allocation Schemes on Sidelink", 3GPP Draft, 3GPP TSG RAN WG1 #99, R1-1912553, 3rd Generation Partnership Project (3GPP), Mobile Competence Centre, 650, Route Des Lucioles, F-06921 Sophia-Antipolis Cedex, France, vol. RAN WG1, No. Reno, Nevada, US, Nov. 18, 2019-Nov. 22, 2019, Nov. 9, 2019 (Nov. 9, 2019), XP051823488, 12 Pages, Retrieved from the Internet: URL: https://ftp.3gpp.org/tsg_ran/WG1_RL1/TSGR1_99/Docs/R1-1912553.zip. R1-1912553 Mode-2 Resource Allocation Schemes on Sidelink Final.docx [retrieved on Nov. 9, 2019] pp. 2-3, 2 Mode 2 Resource Scheme Procedure, pp. 7-8, 5 Whether to Use Released Resource(s) of Feedback-Based Retransmissions of the Transmitting UE.

\* cited by examiner

RESERVED RESOURCE INDICATION FOR SIDELINK

CROSS-REFERENCE TO RELATED APPLICATION

This Patent Applications claims priority to U.S. Provisional Patent Application No. 63/023,508, filed on May 12, 2020, entitled "RESERVED RESOURCE INDICATION FOR SIDELINK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for indicating reserved resources in sidelink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include transmitting a reservation for a sidelink resource for a communication by the UE, wherein the sidelink resource was previously reserved by a transmitter UE for a communication by the transmitter UE; and receiving an indication that the sidelink resource is reserved and that the UE is not permitted to reserve the sidelink resource.

In some aspects, a method of wireless communication, performed by a UE, may include receiving, from a first transmitter UE, a reservation for a sidelink resource for a communication by the first transmitter UE, wherein the sidelink resource was previously reserved by a second transmitter UE for a communication by the second transmitter UE; and transmitting an indication that the sidelink resource is reserved and that the first transmitter UE is not permitted to reserve the sidelink resource.

In some aspects, a UE for wireless communication may include a memory and one or more processors coupled to the memory. The memory and the one or more processors may be configured to transmit a reservation for a sidelink resource for a communication by the UE, wherein the sidelink resource was previously reserved by a transmitter UE for a communication by the transmitter UE; and receive an indication that the sidelink resource is reserved and that the UE is not permitted to reserve the sidelink resource.

In some aspects, a UE for wireless communication may include a memory and one or more processors coupled to the memory. The memory and the one or more processors may be configured to receive, from a first transmitter UE, a reservation for a sidelink resource for a communication by the first transmitter UE, wherein the sidelink resource was previously reserved by a second transmitter UE for a communication by the second transmitter UE; and transmit an indication that the sidelink resource is reserved and that the first transmitter UE is not permitted to reserve the sidelink resource.

In some aspects, a non-transitory computer-readable medium may store one or more instructions for wireless communication. The one or more instructions, when executed by one or more processors of a UE, may cause the one or more processors to transmit a reservation for a sidelink resource for a communication by the UE, wherein the sidelink resource was previously reserved by a transmitter UE for a communication by the transmitter UE; and receive an indication that the sidelink resource is reserved and that the UE is not permitted to reserve the sidelink resource.

In some aspects, a non-transitory computer-readable medium may store one or more instructions for wireless communication. The one or more instructions, when executed by one or more processors of a UE, may cause the one or more processors to receive, from a first transmitter UE, a reservation for a sidelink resource for a communication by the first transmitter UE, wherein the sidelink resource was previously reserved by a second transmitter UE for a communication by the second transmitter UE; and transmit an indication that the sidelink resource is reserved and that the first transmitter UE is not permitted to reserve the sidelink resource.

In some aspects, an apparatus for wireless communication may include means for transmitting a reservation for a sidelink resource for a communication by the apparatus, wherein the sidelink resource was previously reserved by a transmitter apparatus for a communication by the transmitter apparatus; and means for receiving an indication that the sidelink resource is reserved and that the apparatus is not permitted to reserve the sidelink resource.

In some aspects, an apparatus for wireless communication may include means for receiving, from a first transmitter apparatus, a reservation for a sidelink resource for a communication by the first transmitter apparatus, wherein the sidelink resource was previously reserved by a second transmitter apparatus for a communication by the second transmitter apparatus; and means for transmitting an indication that the sidelink resource is reserved and that the first transmitter apparatus is not permitted to reserve the sidelink resource.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
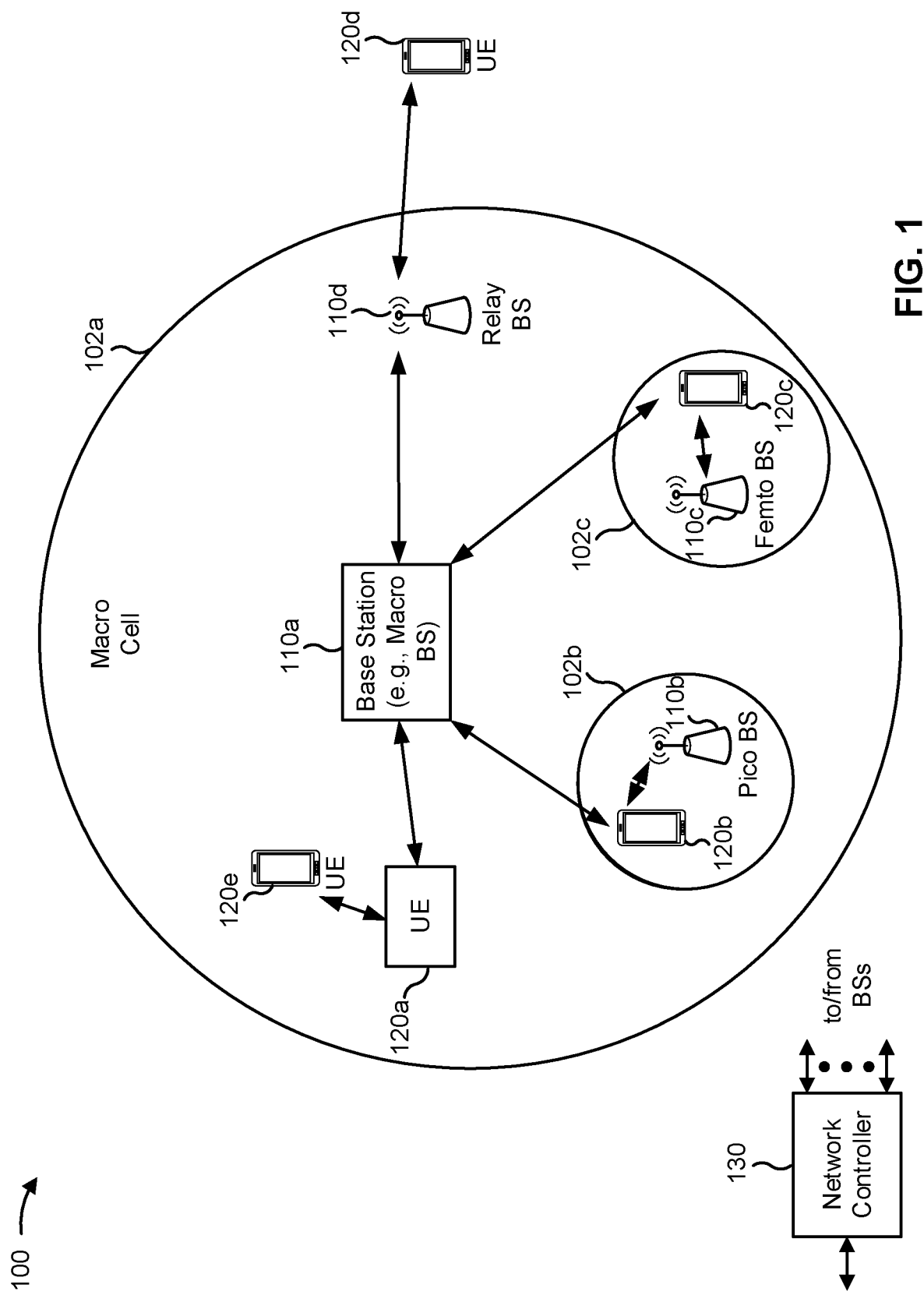
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
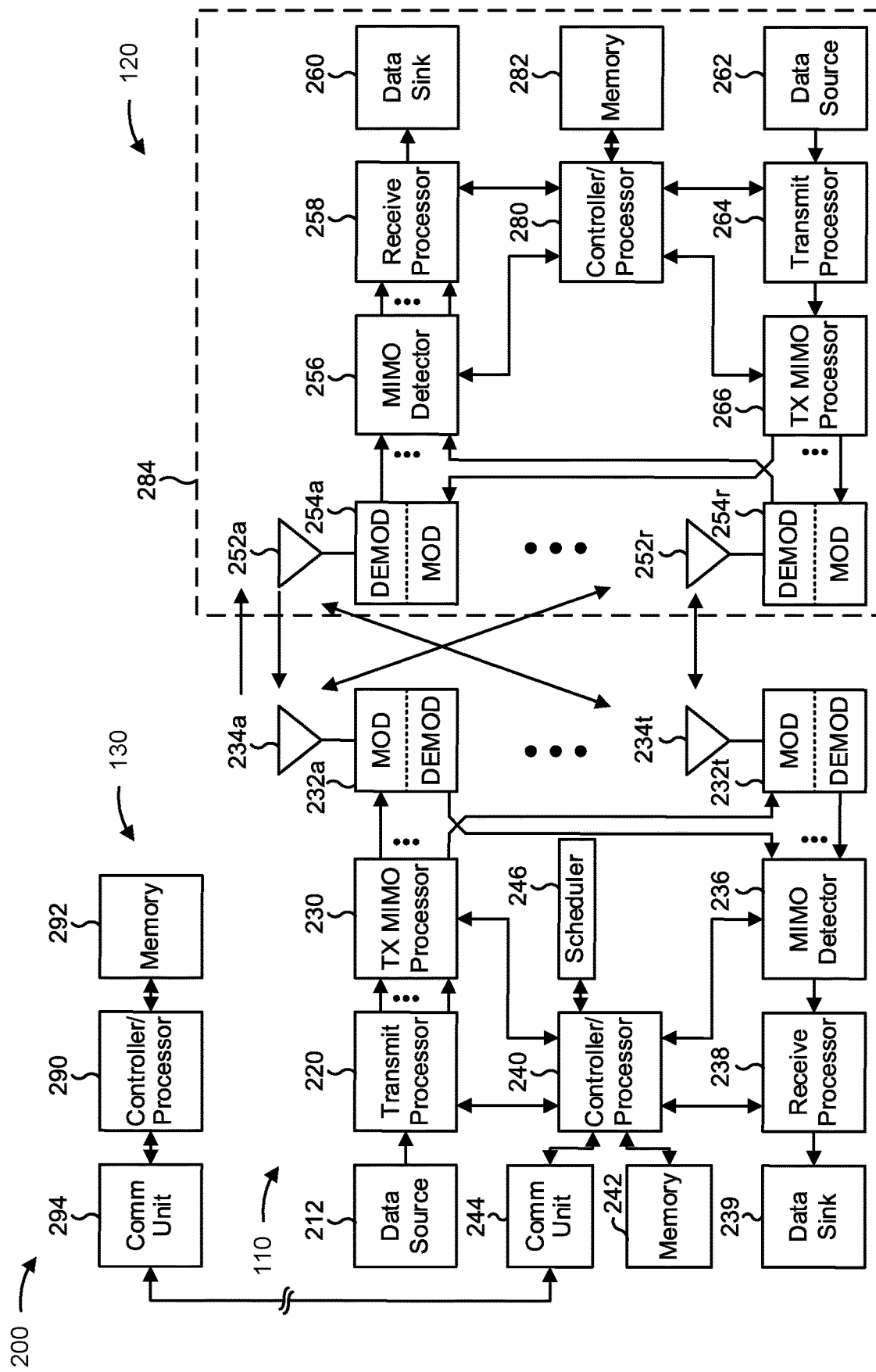
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-7).

Controller/processor 240 of base station 110, controller/processor 280 of UE 120, and/or any other component(s) of FIG. 2 may perform one or more techniques associated with, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, UE 120 may include means for transmitting a reservation for a sidelink resource for a communication by the UE, wherein the sidelink resource was previously reserved by a transmitter UE for a communication by the other UE, means for receiving an indication that the sidelink resource is reserved and that the UE is not permitted to reserve the sidelink resource, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for receiving, from a first transmitter UE, a reservation for a sidelink resource for a communication by the first transmitter UE, wherein the sidelink resource was previously reserved by a second transmitter UE for a communication by the second transmitter UE, means for transmitting an indication that the sidelink resource is reserved and that the first transmitter UE is not permitted to reserve the sidelink resource, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
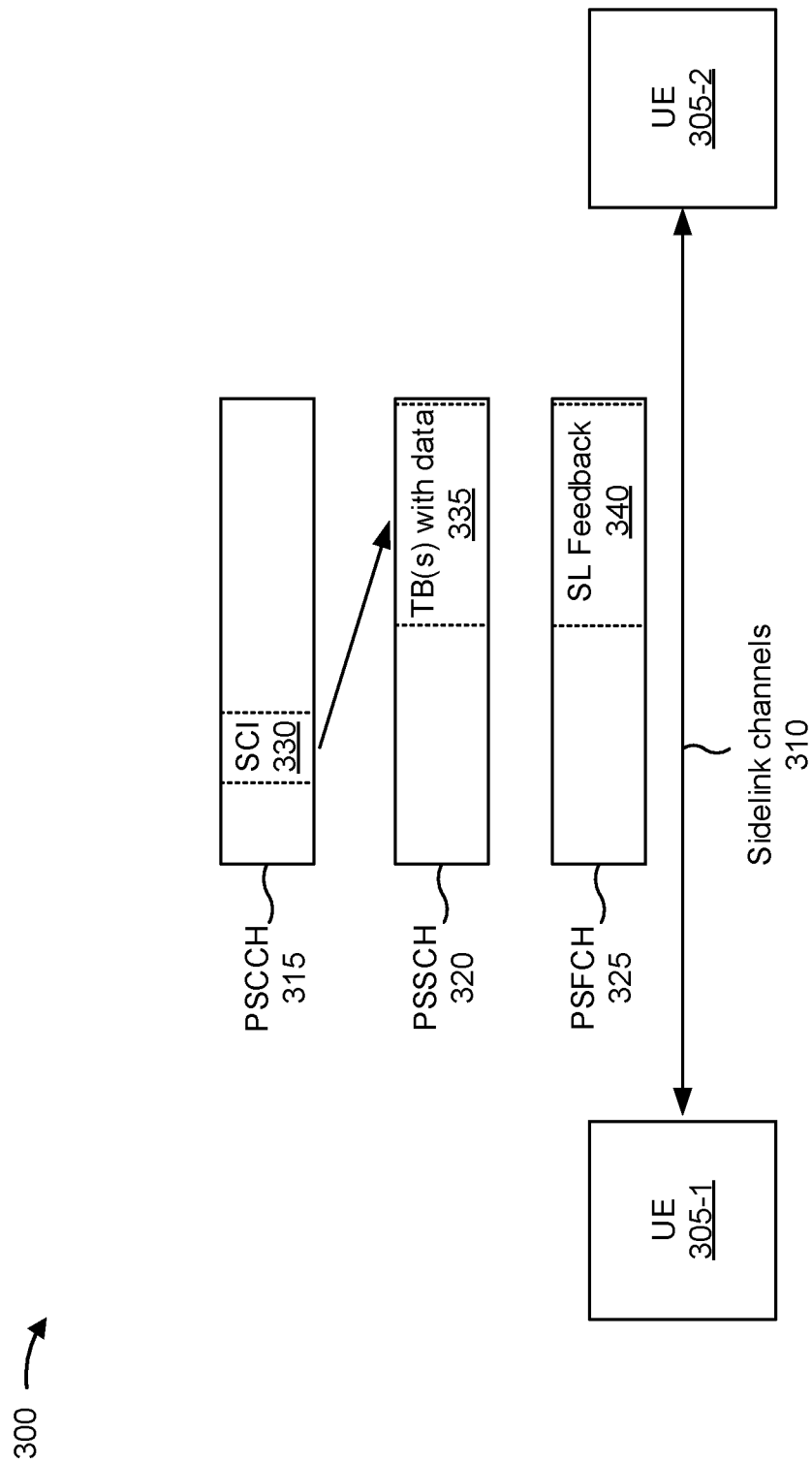
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs. In some aspects, a resource pool can be configured to have a number of RBs that are not multiples of the domain frequency reservation units (e.g., subchannels). These RBs may be unused spare RBs.

In some aspects, a UE 305 may operate using a transmission mode where resource selection and/or scheduling is performed by the UE 305 (e.g., rather than a base station 110). Resource allocation may be reservation based. In some aspects, frequency domain resource allocations may be in units of sub-channels. In some aspects, resource reservation in the time domain may be in units of slots. For example, a UE may reserve one or more sub-channels using SCI. An SCI transmission may reserve resources in the current slot (the slot in which the SCI is transmitted) and/or in up to two future slots.

In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
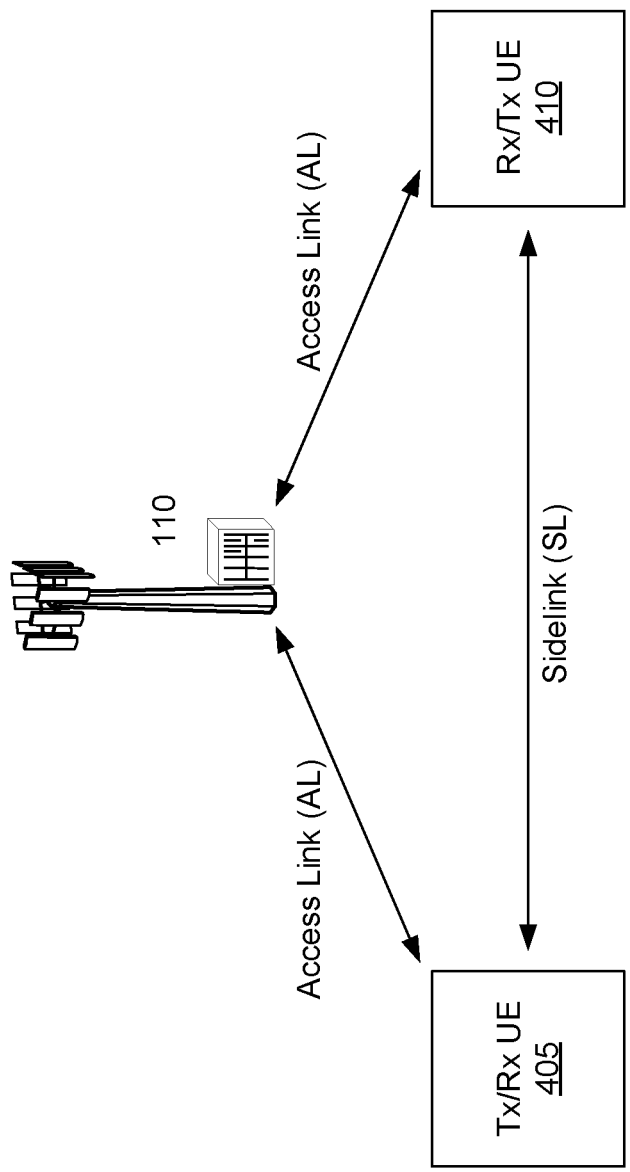
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Sidelink transmissions (which may be referred to herein, interchangeably, as "communications") may have associated priority levels. In some cases, a UE that has a communication with a higher priority level than, or a same priority level as, a priority level of a communication by another UE may preempt the other UE's resource reservation. For example, a first transmitter UE may reserve a sidelink resource for a communication having a first priority level. A transmitter UE is a UE that transmits a communication, is planning to transmit a communication, is capable of transmitting a communication, and/or the like. A second transmitter UE may reserve the same sidelink resource for a communication having a second priority level. If the second priority level is higher than, or the same as, the first priority level, the second transmitter UE's communication may preempt the first UE's communication, in which case the second transmitter UE may transmit using the reserved resource, while the first transmitter UE does not transmit using that resource. This concept of preemption may facilitate transmission of higher priority transmissions when multiple UEs compete for the same resources.

In some cases, a UE with a lower priority communication may improperly preempt a communication of a transmitter UE with a higher priority communication. This may happen as a result of the preempting UE not being aware of the resource reservation by the transmitter UE. In some cases, a UE may miss the resource reservation by the transmitter UE due to half-duplex operation, intra-UE prioritization, a failure to decode SCI, and/or the like. In some cases, a UE may fail to decode SCI for any number of reasons including, for example, noise, interference, the presence of multiple SCI instances in a PSCCH occasion, being located too far away from the transmitter, and/or the like. In some cases, a UE may improperly preempt a communication by decoding an SCI reserving the same resource and basing a preemption decision on a lower priority associated with that reservation instead of a higher priority associated with another reservation of the resource. Resource collisions and improper communication preemptions may lead to limitations in performance in sidelink communications.

Various aspects of techniques and apparatuses described herein may facilitate reducing improper preemption by notifying a UE that a sidelink resource has been reserved and that the UE's preemption of that resource is improper. In some aspects, a transmitter UE may transmit a reservation for a sidelink resource that was previously reserved by another transmitter UE for another communication. The transmitter UE may receive an indication that the sidelink resource is reserved and that the UE is not permitted to reserve the sidelink resource.

In some aspects, the indication may be transmitted by the transmitter UE that first reserved the resource, a receiver UE that is to receive the communication from that UE, a receiver UE that is to receive the communication from the transmitter UE, another UE, a base station, and/or the like. In this way, the transmitter UE may be notified before improperly pre-empting another communication. The transmitter UE may reserve another resource, transmit its communication on another resource, cancel the communication, and/or the like. In some aspects, unused (e.g., for feedback) spare RBs from a resource pool may be used for providing the notification, thereby facilitating avoidance of improper preemption without adding signaling overhead and traffic on the available sidelink resources.

Figure 5:
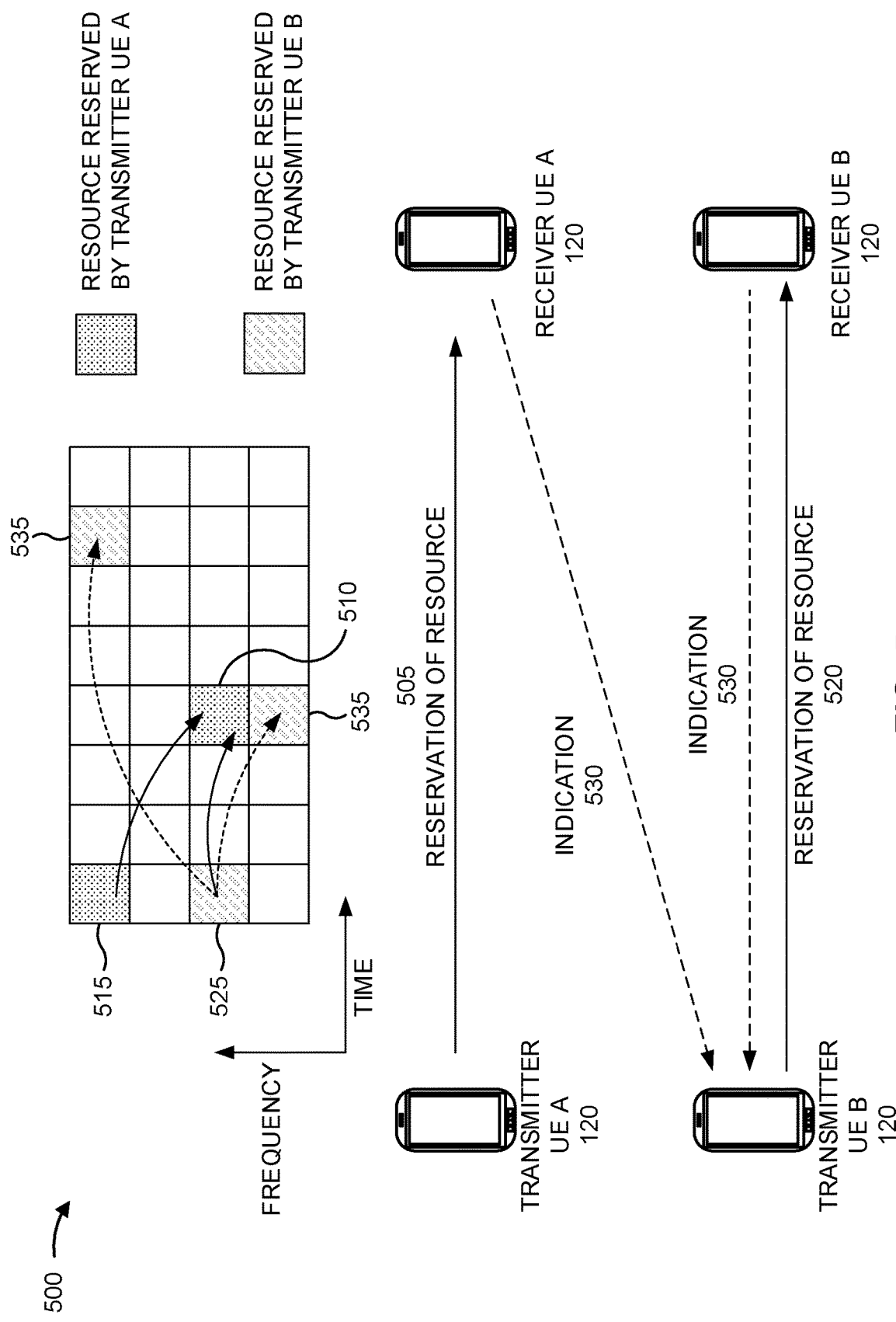
FIG. 5 is a diagram illustrating an example of reserved resource indication for sidelink communications, in accordance with the present disclosure.

FIG. 5 is a diagram illustrating an example 500 of reserved resource indication for sidelink communications, in accordance with the present disclosure. As shown, a transmitter UE A 120, a receiver UE A 120, a transmitter UE B 120, and a receiver UE B 120 may communicate with one another using sidelink communication. In some aspects, the receiver UE A 120 may be a UE that is to receive a communication from the transmitter UE A 120 (also interchangeably known as an "intended receiver" of the communication from the transmitter UE A 120), and the receiver UE B 120 may be a UE that is to receive a communication from the transmitter UE B 120 (also interchangeably known as an "intended receiver" of the transmission from the transmitter UE B 120).

As shown by reference number 505, the transmitter UE A 120 may transmit a reservation for a sidelink resource 510 for a communication, thereby reserving the sidelink resource 510. In some aspects, the sidelink resource 510 may include a frequency domain resource (e.g., one or more subchannels, and/or the like), a time domain resource (e.g., one or more slots, and/or the like), and/or the like. In some aspects, the transmitter UE A 120 may reserve the sidelink resource by indicating the resource reservation in SCI transmitted using a previously reserved resource 515.

As shown by reference number 520, the transmitter UE B 120 may transmit a reservation for the sidelink resource 510 to be used for a communication. The communication may include a unicast transmission, a broadcast transmission, a groupcast transmission, and/or the like. In some aspects, the transmitter UE B 120 may transmit the reservation using SCI in a previously-reserved sidelink resource 525.

As shown by reference number 530, the transmitter UE B 120 may receive an indication that the sidelink resource 510 is reserved and that the transmitter UE B 120 is not permitted to reserve the sidelink resource 510. In some aspects, the indication may be referred to as a conflict indication. The indication may be transmitted to the transmitter UE B 120 based at least in part on a determination that the transmitter UE B 120 is not permitted to pre-empt the communication by the transmitter UE A 120. In some aspects, the determination may be based at least in part on a priority of the communication by the transmitter UE A 120, the transmitter UE B 120, and/or the like. In some aspects, the priority of the communication by the transmitter UE A 120 may be higher than, or the same as, the priority of the communication by the transmitter UE B 120.

In some aspects, the indication may be transmitted by the receiver UE A 120, the receiver UE B 120, and/or the like. In some aspects, the indication may be transmitted by the transmitter UE A 120. In some aspects, the indication may be transmitted by a base station (e.g., base station 110 shown in FIG. 1). In some aspects, the transmitter UE B 120 may transmit, to a base station, a message indicating that the transmitter UE B 120 is not permitted to reserve the sidelink resource. In some aspects, the transmitter UE B 120 may transmit, to the base station, an indication that the transmitter UE B 120 received the indication that the sidelink resource 510 is reserved and that the transmitter UE B 120 is not permitted to reserve the sidelink resource 510.

In some aspects, based at least in part on receiving the indication, the transmitter UE B 120 may cancel the communication. In some aspects, the transmitter UE B 120 may transmit the communication using a different sidelink resource. The different sidelink resource may be a sidelink resource that is different than the sidelink resource 510, and the transmitter UE B 120 may transmit the communication using the different sidelink resource instead of the sidelink resource 510. In some aspects, the different sidelink resource may be selected by the transmitter UE B 120, allocated by a base station, and/or the like. In some aspects, the transmitter UE B 120 may reserve another sidelink resource 535 for transmitting the communication. As shown, the other sidelink resource 535 may have a different location in the time domain and/or the frequency domain than the sidelink resource 510.

In some aspects, the indication that the sidelink resource 510 is reserved and that the transmitter UE B 120 is not permitted to reserve the sidelink resource 510 may not identify the transmitter UE A 120. In some aspects, the indication may be carried in a broadcast transmission. The indication may be carried on a dedicated physical channel. In some aspects, the dedicated physical channel may be a sequence-based physical channel. In some aspects, the indication may be carried on a PSCCH. In some aspects, the indication may be carried in SCI on the PSCCH. In some aspects, the SCI may include a first stage (stage 1) SCI (SCI-1) transmission. The indication may be indicated explicitly in the SCI-1 transmission. In some aspects, the indication may be carried in a dedicated second stage (stage 2) SCI format (SCI-2) transmission. In some aspects, the indication may be implied by an additional reservation (a re-reservation) of the sidelink resource 510 for the communication by the transmitter UE A 120. The indication may be implied based at least in part on the communication by the transmitter UE A 120 having a higher priority than the communication by the transmitter UE B 120.

In some aspects, the indication may be carried in a medium access control (MAC)-control element (CE). In some aspects, the indication may include a signaling sequence similar to a sequence used to transmit PSFCH feedback. In some aspects, the indication may include a sequence carried on a single frequency network (SFN) resource. In some aspects, the indication may include a PSFCH sequence, where the SFN comprises the PSFCH. In some aspects, for example, the indication may be carried using a single resource. The single resource may include a PSFCH resource. In some aspects, the indication may be carried using one or more PSFCH resources. The one or more PSFCH resources may be unused PSFCH resources (e.g., unused for feedback). In some aspects, the indication may include a sequence that is generated and based at least in part on a source identifier of the UE. In some aspects, the indication may include a sequence that is transmitted based at least in part on a source identifier of the UE. In some aspects, the indication may be carried using one or more spare physical RBs from a sidelink resource pool.

Various aspects of techniques described above may facilitate reducing improper preemption by notifying a UE that a sidelink resource has been reserved and that the UE's preemption of that resource is improper. In this way, the transmitter UE may be notified before improperly preempting another communication. The transmitter UE may reserve another resource, transmit its communication on another resource, cancel the communication, and/or the like. In some aspects, unused spare RBs from a resource pool may be used for providing the notification, thereby facilitating improper preemption avoidance without adding signaling overhead and traffic on the available sidelink resources.

As indicated above, FIG. 5 is provided as an example. Other examples may differ from what is described with respect to FIG. 5.

Figure 6:
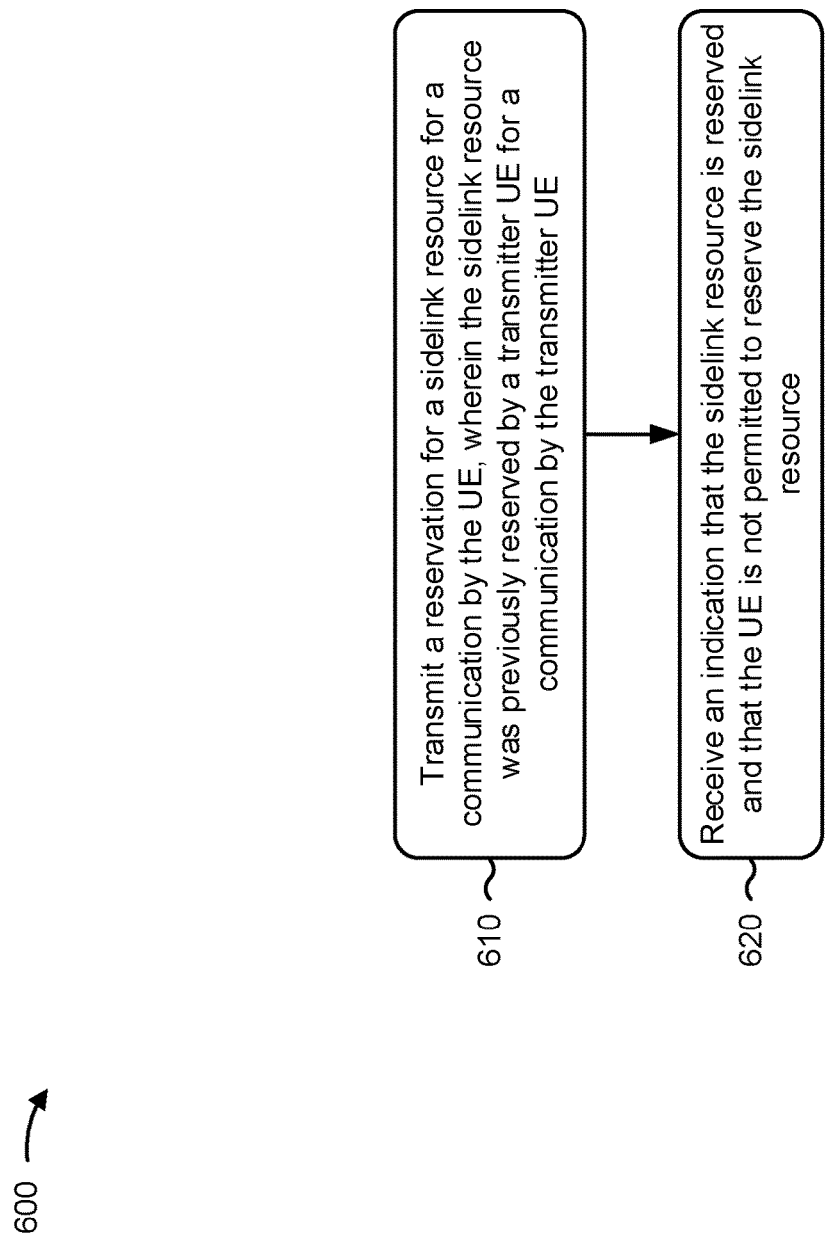
FIGS. 6 and 7 are diagrams illustrating example processes performed, for example, by a user equipment, in accordance with the present disclosure.

FIG. 6 is a diagram illustrating an example process 600 performed, for example, by a UE, in accordance with the present disclosure. Example process 600 is an example where the UE (e.g., UE 120) performs operations associated with reserved resource indications for sidelink.

As shown in FIG. 6, in some aspects, process 600 may include transmitting a reservation for a sidelink resource for a communication by the UE, wherein the sidelink resource was previously reserved by a transmitter UE for a communication by the transmitter UE (block 610). For example, the UE (e.g., using transmit processor 264, controller/processor 280, memory 282, and/or the like) may transmit a reservation for a sidelink resource for a communication by the UE, as described above. In some aspects, the sidelink resource was previously reserved by a transmitter UE for a communication by the transmitter UE.

As further shown in FIG. 6, in some aspects, process 600 may include receiving an indication that the sidelink resource is reserved and that the UE is not permitted to reserve the sidelink resource (block 620). For example, the UE (e.g., using receive processor 258, controller/processor 280, memory 282, and/or the like) may receive an indication that the sidelink resource is reserved and that the UE is not permitted to reserve the sidelink resource, as described above.

Process 600 may include additional aspects, such as any single aspect or any combination of aspects described below and/or in connection with one or more other processes described elsewhere herein.

In a first aspect, receiving the indication comprises receiving the indication based at least in part on a determination that the UE is not permitted to pre-empt the communication by the transmitter UE.

In a second aspect, alone or in combination with the first aspect, the indication is received from the transmitter UE.

In a third aspect, alone or in combination with the first aspect, the indication is received from a receiver UE, wherein the receiver UE comprises an intended receiver of the communication by the UE, an intended receiver of the communication by the transmitter UE, or a combination thereof.

In a fourth aspect, alone or in combination with the first aspect, the indication is received from a base station.

In a fifth aspect, alone or in combination with one or more of the first through fourth aspects, process 600 includes transmitting, to a base station, a message indicating that the UE is not permitted to reserve the sidelink resource.

In a sixth aspect, alone or in combination with one or more of the first through fifth aspects, the determination that the UE is not permitted to pre-empt the communication by the transmitter UE is based at least in part on a priority of the communication by the transmitter UE.

In a seventh aspect, alone or in combination with the sixth aspect, the priority of the communication by the transmitter UE is higher than, or the same as, a priority of the communication by the UE.

In an eighth aspect, alone or in combination with one or more of the first through seventh aspects, the transmitter UE reserves the sidelink resource using sidelink control information.

In a ninth aspect, alone or in combination with one or more of the first through eighth aspects, process 600 includes canceling the communication by the UE based at least in part on receiving the indication.

In a tenth aspect, alone or in combination with one or more of the first through eighth aspects, process 600 includes transmitting the communication by the UE using a different sidelink resource instead of the sidelink resource based at least in part on receiving the indication.

In an eleventh aspect, alone or in combination with the tenth aspect, the different sidelink resource is allocated by a base station.

In a twelfth aspect, alone or in combination with the tenth aspect, the different sidelink resource is selected by the UE.

In a thirteenth aspect, alone or in combination with the tenth aspect, process 600 includes reserving the different sidelink resource selected by the UE.

In a fourteenth aspect, alone or in combination with one or more of the first through thirteenth aspects, the communication by the UE comprises a unicast transmission, a broadcast transmission, or a groupcast transmission.

In a fifteenth aspect, alone or in combination with one or more of the first through fourteenth aspects, the indication does not identify the transmitter UE.

In a sixteenth aspect, alone or in combination with one or more of the first through fifteenth aspects, the indication is carried in a broadcast transmission.

In a seventeenth aspect, alone or in combination with one or more of the first through sixteenth aspects, the indication is carried on a dedicated physical channel.

In an eighteenth aspect, alone or in combination with the seventeenth aspect, the dedicated physical channel is a sequence-based physical channel.

In a nineteenth aspect, alone or in combination with one or more of the first through eighteenth aspects, the indication is carried on a PSCCH.

In a twentieth aspect, alone or in combination with the nineteenth aspect, the indication is carried in SCI on the PSCCH.

In a twenty-first aspect, alone or in combination with the twentieth aspect, the SCI comprises a first stage SCI transmission.

In a twenty-second aspect, alone or in combination with the twenty-first aspect, the indication is indicated explicitly using at least one bit in the first stage SCI transmission.

In a twenty-third aspect, alone or in combination with one or more of the first through twenty-second aspects, the indication is implied by an additional reservation, by the transmitter UE, of the sidelink resource for the communication by the transmitter UE, wherein the additional reservation indicates that the communication by the transmitter UE has a priority that is higher than a priority of the communication by the UE.

In a twenty-fourth aspect, alone or in combination with one or more of the first through twenty-third aspects, the indication is carried in a MAC-CE.

In a twenty-fifth aspect, alone or in combination with one or more of the first through twenty-third aspects, the indication is carried in a dedicated stage 2 sidelink control information format.

In a twenty-sixth aspect, alone or in combination with one or more of the first through twenty-fifth aspects, the indication comprises a sequence.

In a twenty-seventh aspect, alone or in combination with one or more of the first through twenty-sixth aspects, the indication comprises a sequence that is the same as a PSFCH sequence.

In a twenty-eighth aspect, alone or in combination with one or more of the first through twenty-seventh aspects, the indication comprises a sequence that is generated based at least in part on a source identifier of the UE.

In a twenty-ninth aspect, alone or in combination with one or more of the first through twenty-eighth aspects, the indication comprises a sequence that is transmitted based at least in part on a source identifier of the UE.

In a thirtieth aspect, alone or in combination with one or more of the first through twenty-ninth aspects, the indication comprises a sequence carried on a single resource.

In a thirty-first aspect, alone or in combination with the thirtieth aspect, the single resource comprises a PSFCH resource.

In a thirty-second aspect, alone or in combination with one or more of the first through thirty-first aspects, the indication is carried using one or more PSFCH resources.

In a thirty-third aspect, alone or in combination with the thirty-second aspect, the one or more PSFCH resources are unused for feedback.

In a thirty-fourth aspect, alone or in combination with one or more of the first through thirty-third aspects, the indication is carried using one or more spare PRBs from a sidelink resource pool.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
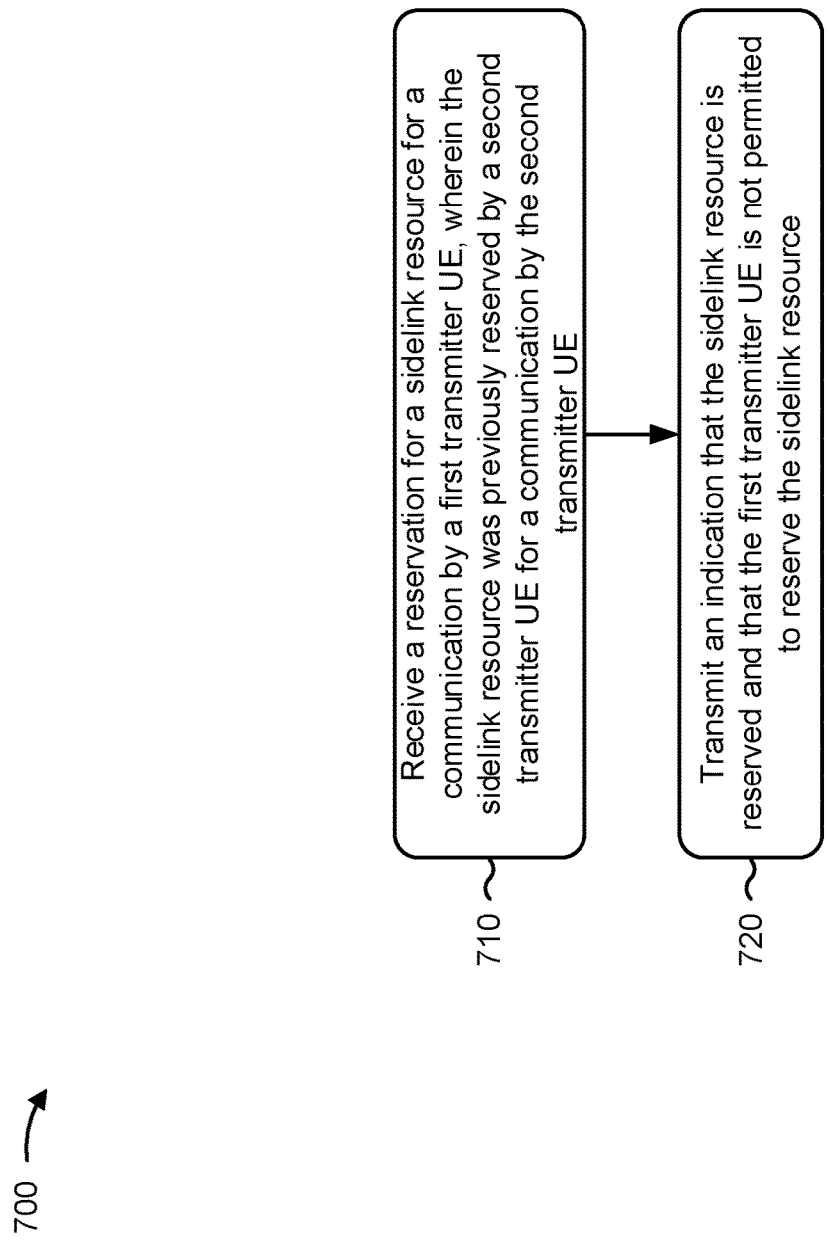

FIG. 7 is a diagram illustrating an example process 700 performed, for example, by a UE, in accordance with the present disclosure. Example process 700 is an example where the UE (e.g., UE 120) performs operations associated with reserved resource indications for sidelink.

As shown in FIG. 7, in some aspects, process 700 may include receiving, from a first transmitter UE, a reservation for a sidelink resource for a communication by the first transmitter UE, wherein the sidelink resource was previously reserved by a second transmitter UE for a communication by the second transmitter UE (block 710). For example, the UE (e.g., using receive processor 258, controller/processor 280, memory 282, and/or the like) may receive, from a first transmitter UE, a reservation for a sidelink resource for a communication by the first transmitter UE, as described above. In some aspects, the sidelink resource was previously reserved by a second transmitter UE for a communication by the second transmitter UE.

As further shown in FIG. 7, in some aspects, process 700 may include transmitting, an indication that the sidelink resource is reserved and that the first transmitter UE is not permitted to reserve the sidelink resource (block 720). For example, the UE (e.g., using transmit processor 264, controller/processor 280, memory 282, and/or the like) may transmit, an indication that the sidelink resource is reserved and that the first transmitter UE is not permitted to reserve the sidelink resource, as described above.

Process 700 may include additional aspects, such as any single aspect or any combination of aspects described below and/or in connection with one or more other processes described elsewhere herein.

In a first aspect, transmitting the indication comprises transmitting the indication based at least in part on a determination that the first transmitter UE is not permitted to pre-empt the communication by the second transmitter UE.

In a second aspect, alone or in combination with the first aspect, the UE comprises the second transmitter UE.

In a third aspect, alone or in combination with the first aspect, the UE comprises a receiver UE, wherein the receiver UE comprises an intended receiver of the communication by the first transmitter UE, an intended receiver of the communication by the second transmitter UE, or a combination thereof.

In a fourth aspect, alone or in combination with one or more of the first through third aspects, process 700 includes transmitting, to a base station, a message indicating that the first transmitter UE is not permitted to reserve the sidelink resource.

In a fifth aspect, alone or in combination with one or more of the first through fourth aspects, the determination that the first transmitter UE is not permitted to pre-empt the communication by the second transmitter UE is based at least in part on a priority of the communication by the second transmitter UE.

In a sixth aspect, alone or in combination with the fifth aspect, the priority of the communication by the second transmitter UE is higher than, or the same as, a priority of the communication by the first transmitter UE.

In a seventh aspect, alone or in combination with one or more of the first through sixth aspects, the second transmitter UE reserves the sidelink resource using SCI.

In an eighth aspect, alone or in combination with one or more of the first through seventh aspects, the communication by the first transmitter UE is canceled based at least in part on the indication.

In a ninth aspect, alone or in combination with one or more of the first through seventh aspects, the communication by the first transmitter UE is transmitted using a different sidelink resource instead of the sidelink resource based at least in part on the indication.

In a tenth aspect, alone or in combination with the ninth aspect, the different sidelink resource is allocated by a base station.

In an eleventh aspect, alone or in combination with the tenth aspect, the different sidelink resource is selected by the first transmitter UE.

In a twelfth aspect, alone or in combination with the ninth aspect, the different sidelink resource is reserved by the first transmitter UE based at least in part on the indication.

In a thirteenth aspect, alone or in combination with one or more of the first through twelfth aspects, the communication by the first transmitter UE comprises a unicast transmission, a broadcast transmission, or a groupcast transmission.

In a fourteenth aspect, alone or in combination with one or more of the first through thirteenth aspects, the indication does not identify the second transmitter UE.

In a fifteenth aspect, alone or in combination with one or more of the first through fourteenth aspects, the indication is carried in a broadcast transmission.

In a sixteenth aspect, alone or in combination with one or more of the first through fifteenth aspects, the indication is carried on a dedicated physical channel.

In a seventeenth aspect, alone or in combination with the sixteenth aspect, the dedicated physical channel is a sequence-based physical channel.

In an eighteenth aspect, alone or in combination with one or more of the first through seventeenth aspects, the indication is carried on a PSCCH.

In a nineteenth aspect, alone or in combination with the eighteenth aspect, the indication is carried in SCI on the PSCCH.

In a twentieth aspect, alone or in combination with the nineteenth aspect, the SCI comprises a first stage SCI transmission.

In a twenty-first aspect, alone or in combination with the twentieth aspect, the indication is indicated explicitly using at least one bit in the first stage SCI transmission.

In a twenty-second aspect, alone or in combination with one or more of the first through twenty-first aspects, the UE comprises the second transmitter UE, and wherein the indication comprises an additional reservation of the sidelink resource for the communication by the second transmitter UE, wherein the communication by the second transmitter UE has a priority that is higher than a priority of the communication by the first transmitter UE.

In a twenty-third aspect, alone or in combination with one or more of the first through twenty-second aspects, the indication is carried in a MAC-CE.

In a twenty-fourth aspect, alone or in combination with one or more of the first through twenty-second aspects, the indication is carried in a dedicated stage 2 sidelink control information format.

In a twenty-fifth aspect, alone or in combination with one or more of the first through twenty-fourth aspects, the indication comprises a sequence.

In a twenty-sixth aspect, alone or in combination with one or more of the first through twenty-fifth aspects, the indication comprises a sequence that is the same as a PSFCH sequence.

In a twenty-seventh aspect, alone or in combination with one or more of the first through twenty-sixth aspects, the indication comprises a sequence that is generated based at least in part on a source identifier of the first transmitter UE.

In a twenty-eighth aspect, alone or in combination with one or more of the first through twenty-seventh aspects, the indication comprises a sequence that is transmitted based at least in part on a source identifier of the first transmitter UE.

In a twenty-ninth aspect, alone or in combination with one or more of the first through twenty-eighth aspects, the indication comprises a sequence carried on a single resource.

In a thirtieth aspect, alone or in combination with the twenty-ninth aspect, the single resource comprises a PSFCH resource.

In a thirty-first aspect, alone or in combination with one or more of the first through thirtieth aspects, the indication is carried using one or more PSFCH resources.

In a thirty-second aspect, alone or in combination with the thirty-first aspect, the one or more PSFCH resources are unused for feedback.

In a thirty-third aspect, alone or in combination with one or more of the first through thirty-second aspects, the indication is carried using one or more spare PRBs from a sidelink resource pool.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment (UE), comprising: transmitting a reservation for a sidelink resource for a communication by the UE, wherein the sidelink resource was previously reserved by a transmitter UE for a communication by the transmitter UE; and receiving an indication that the sidelink resource is reserved and that the UE is not permitted to reserve the sidelink resource.

Aspect 2: The method of Aspect 1, wherein receiving the indication comprises receiving the indication based at least in part on a determination that the UE is not permitted to pre-empt the communication by the transmitter UE.

Aspect 3: The method of either of Aspects 1 or 2, wherein the indication is received from the transmitter UE.

Aspect 4: The method of either of Aspects 1 or 2, wherein the indication is received from a receiver UE, wherein the receiver UE comprises: an intended receiver of the communication by the UE, an intended receiver of the communication by the transmitter UE, or a combination thereof.

Aspect 5: The method of either of Aspects 1 or 2, wherein the indication is received from a base station.

Aspect 6: The method of any of Aspects 1-5, further comprising transmitting, to a base station, a message indicating that the UE is not permitted to reserve the sidelink resource.

Aspect 7: The method of any of Aspects 1-6, wherein the determination that the UE is not permitted to pre-empt the communication by the transmitter UE is based at least in part on a priority of the communication by the transmitter UE.

Aspect 8: The method of Aspect 7, wherein the priority of the communication by the transmitter UE is higher than, or the same as, a priority of the communication by the UE.

Aspect 9: The method of any of Aspects 1-8, wherein the transmitter UE reserves the sidelink resource using sidelink control information.

Aspect 10: The method of any of Aspects 1-9, further comprising canceling the communication by the UE based at least in part on receiving the indication.

Aspect 11: The method of any of Aspects 1-9, further comprising transmitting the communication by the UE using a different sidelink resource instead of the sidelink resource based at least in part on receiving the indication.

Aspect 12: The method of Aspect 11, wherein the different sidelink resource is allocated by a base station.

Aspect 13: The method of Aspect 11, wherein the different sidelink resource is selected by the UE.

Aspect 14: The method of Aspect 13, further comprising reserving the different sidelink resource selected by the UE.

Aspect 15: The method of any of Aspects 1-14, wherein the communication by the UE comprises: a unicast transmission, a broadcast transmission, or a groupcast transmission.

Aspect 16: The method of any of Aspects 1-15, wherein the indication does not identify the transmitter UE.

Aspect 17: The method of any of Aspects 1-16, wherein the indication is carried in a broadcast transmission.

Aspect 18: The method of any of Aspects 1-17, wherein the indication is carried on a dedicated physical channel.

Aspect 19: The method of Aspect 18, wherein the dedicated physical channel is a sequence-based physical channel.

Aspect 20: The method of any of Aspects 1-19, wherein the indication is carried on a physical sidelink control channel (PSCCH).

Aspect 21: The method of Aspect 20, wherein the indication is carried in sidelink control information (SCI) on the PSCCH.

Aspect 22: The method of Aspect 21, wherein the SCI comprises a stage 1 SCI (SCI-1) transmission.

Aspect 23: The method of Aspect 22, wherein the indication is indicated explicitly using at least one bit in the SCI-1 transmission.

Aspect 24: The method of any of Aspects 1-23 wherein the indication is implied by an additional reservation, by the transmitter UE, of the sidelink resource for the communication by the transmitter UE, wherein the additional reservation indicates that the communication by the transmitter UE has a priority that is higher than a priority of the communication by the UE.

Aspect 25: The method of any of Aspects 1-24, wherein the indication is carried in a medium access control (MAC) control element.

Aspect 26: The method of any of Aspects 1-24, wherein the indication is carried in a dedicated stage 2 sidelink control information format.

Aspect 27: The method of any of Aspects 1-26, wherein the indication comprises a sequence.

Aspect 28: The method of any of Aspects 1-27, wherein the indication comprises a sequence that is the same as a physical sidelink feedback channel sequence.

Aspect 29: The method of any of Aspects 1-28, wherein the indication comprises a sequence that is generated based at least in part on a source identifier of the UE.

Aspect 30: The method of any of Aspects 1-29, wherein the indication comprises a sequence that is transmitted based at least in part on a source identifier of the UE.

Aspect 31: The method of any of Aspects 1-30, wherein the indication comprises a sequence carried on a single resource.

Aspect 32: The method of Aspect 31, wherein the single resource comprises a physical sidelink feedback channel resource.

Aspect 33: The method of any of Aspects 1-32, wherein the indication is carried using one or more physical sidelink feedback channel (PSFCH) resources.

Aspect 34: The method of Aspect 33, wherein the one or more PSFCH resources are unused for feedback.

Aspect 35: The method of any of Aspects 1-34, wherein the indication is carried using one or more spare physical resource blocks (PRBs) from a sidelink resource pool.

Aspect 36: A method of wireless communication performed by a user equipment (UE), comprising: receiving, from a first transmitter UE, a reservation for a sidelink resource for a communication by the first transmitter UE, wherein the sidelink resource was previously reserved by a second transmitter UE for a communication by the second transmitter UE; and transmitting, an indication that the sidelink resource is reserved and that the first transmitter UE is not permitted to reserve the sidelink resource.

Aspect 37: The method of Aspect 36, wherein transmitting the indication comprises transmitting the indication based at least in part on a determination that the first transmitter UE is not permitted to pre-empt the communication by the second transmitter UE.

Aspect 38: The method of either of Aspects 36 or 37, wherein the UE comprises the second transmitter UE.

Aspect 39: The method of either of Aspects 36 or 37, wherein the UE comprises a receiver UE, wherein the receiver UE comprises: an intended receiver of the communication by the first transmitter UE, an intended receiver of the communication by the second transmitter UE, or a combination thereof.

Aspect 40: The method of any of Aspects 36-39, further comprising transmitting, to a base station, a message indicating that the first transmitter UE is not permitted to reserve the sidelink resource.

Aspect 41: The method of any of Aspects 36-40, wherein the determination that the first transmitter UE is not permitted to pre-empt the communication by the second transmitter UE is based at least in part on a priority of the communication by the second transmitter UE.

Aspect 42: The method of Aspect 41, wherein the priority of the communication by the second transmitter UE is higher than, or the same as, a priority of the communication by the first transmitter UE.

Aspect 43: The method of any of Aspects 36-42, wherein the second transmitter UE reserves the sidelink resource using sidelink control information.

Aspect 44: The method of any of Aspects 36-43, wherein the communication by the first transmitter UE is canceled based at least in part on the indication.

Aspect 45: The method of any of Aspects 36-43, wherein the communication by the first transmitter UE is transmitted using a different sidelink resource instead of the sidelink resource based at least in part on the indication.

Aspect 46: The method of Aspect 45, wherein the different sidelink resource is allocated by a base station.

Aspect 47: The method of Aspect 46, wherein the different sidelink resource is selected by the first transmitter UE.

Aspect 48: The method of Aspect 45, wherein the different sidelink resource is reserved by the first transmitter UE based at least in part on the indication.

Aspect 49: The method of any of Aspects 36-48, wherein the communication by the first transmitter UE comprises: a unicast transmission, a broadcast transmission, or a groupcast transmission.

Aspect 50: The method of any of Aspects 36-49, wherein the indication does not identify the second transmitter UE.

Aspect 51: The method of any of Aspects 36-50, wherein the indication is carried in a broadcast transmission.

Aspect 52: The method of any of Aspects 36-51, wherein the indication is carried on a dedicated physical channel.

Aspect 53: The method of Aspect 52, wherein the dedicated physical channel is a sequence-based physical channel.

Aspect 54: The method of any of Aspects 36-53, wherein the indication is carried on a physical sidelink control channel (PSCCH).

Aspect 55: The method of Aspect 54, wherein the indication is carried in sidelink control information (SCI) on the PSCCH.

Aspect 56: The method of Aspect 55, wherein the SCI comprises a stage 1 SCI (SCI-1) transmission.

Aspect 57: The method of Aspect 56, wherein the indication is indicated explicitly using at least one bit in the SCI-1 transmission.

Aspect 58: The method of any of Aspects 36-57, wherein the UE comprises the second transmitter UE, and wherein the indication comprises an additional reservation of the sidelink resource for the communication by the second transmitter UE, wherein the communication by the second transmitter UE has a priority that is higher than a priority of the communication by the first transmitter UE.

Aspect 59: The method of any of Aspects 36-58, wherein the indication is carried in a medium access control (MAC) control element.

Aspect 60: The method of any of Aspects 36-58, wherein the indication is carried in a dedicated stage 2 sidelink control information format.

Aspect 61: The method of any of Aspects 36-60, wherein the indication comprises a sequence.

Aspect 62: The method of any of Aspects 36-61, wherein the indication comprises a sequence that is the same as a physical sidelink feedback channel sequence.

Aspect 63: The method of any of Aspects 36-62, wherein the indication comprises a sequence that is generated based at least in part on a source identifier of the first transmitter UE.

Aspect 64: The method of any of Aspects 36-63, wherein the indication comprises a sequence that is transmitted based at least in part on a source identifier of the first transmitter UE.

Aspect 65: The method of any of Aspects 36-64, wherein the indication comprises a sequence carried on a single resource.

Aspect 66: The method of Aspect 65, wherein the single resource comprises a physical sidelink feedback channel resource.

Aspect 67: The method of any of Aspects 36-66, wherein the indication is carried using one or more physical sidelink feedback channel (PSFCH) resources.

Aspect 68: The method of Aspect 67, wherein the one or more PSFCH resources are unused for feedback.

Aspect 69: The method of any of Aspects 36-68, wherein the indication is carried using one or more spare physical resource blocks (PRBs) from a sidelink resource pool.

Aspect 70: An apparatus for wireless communication at a device, comprising a processor; memory coupled with the processor; and instructions stored in the memory and executable by the processor to cause the apparatus to perform the method of one or more Aspects of Aspects 1-35.

Aspect 71: A device for wireless communication, comprising a memory and one or more processors coupled to the memory, the memory and the one or more processors configured to perform the method of one or more Aspects of Aspects 1-35.

Aspect 72: An apparatus for wireless communication, comprising at least one means for performing the method of one or more Aspects of Aspects 1-35.

Aspect 73: A non-transitory computer-readable medium storing code for wireless communication, the code comprising instructions executable by a processor to perform the method of one or more Aspects of Aspects 1-35.

Aspect 74: A non-transitory computer-readable medium storing a set of instructions for wireless communication, the set of instructions comprising one or more instructions that, when executed by one or more processors of a device, cause the device to perform the method of one or more Aspects of Aspects 1-35.

Aspect 75: An apparatus for wireless communication at a device, comprising a processor; memory coupled with the processor; and instructions stored in the memory and executable by the processor to cause the apparatus to perform the method of one or more Aspects of Aspects 36-69.

Aspect 76: A device for wireless communication, comprising a memory and one or more processors coupled to the memory, the memory and the one or more processors configured to perform the method of one or more Aspects of Aspects 36-69.

Aspect 77: An apparatus for wireless communication, comprising at least one means for performing the method of one or more Aspects of Aspects 36-69.

Aspect 78: A non-transitory computer-readable medium storing code for wireless communication, the code comprising instructions executable by a processor to perform the method of one or more Aspects of Aspects 36-69.

Aspect 79: A non-transitory computer-readable medium storing a set of instructions for wireless communication, the set of instructions comprising one or more instructions that, when executed by one or more processors of a device, cause the device to perform the method of one or more Aspects of Aspects 36-69.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, based at least in part on information stored in the one or more memories, configured to:
   transmit, to a receiver UE, a reservation for a sidelink resource for a communication by the UE, wherein the sidelink resource was previously reserved by a transmitter UE for a communication by the transmitter UE; and
   receive, from the receiver UE, an indication that the sidelink resource is reserved and that the UE is not permitted to reserve the sidelink resource, wherein the indication comprises a sequence.

2. The apparatus of claim 1, wherein the one or more processors, to receive the indication, are configured to cause the UE to receive the indication based at least in part on a determination that the UE is not permitted to pre-empt the communication by the transmitter UE.

3. The apparatus of claim 2, wherein the determination that the UE is not permitted to pre-empt the communication by the transmitter UE is based at least in part on a priority of the communication by the transmitter UE, wherein the priority of the communication by the transmitter UE is higher than, or the same as, a priority of the communication by the UE.

4. The apparatus of claim 1, wherein the receiver UE comprises the transmitter UE.

5. The apparatus of claim 1, wherein the receiver UE comprises:
   an intended receiver of the communication by the UE,
   an intended receiver of the communication by the transmitter UE, or
   a combination thereof.

6. The apparatus of claim 1, wherein the one or more processors are further configured to cause the UE to cancel the communication by the UE based at least in part on receiving the indication.

7. The apparatus of claim 1, wherein the one or more processors are further configured to cause the UE to transmit the communication by the UE using a different sidelink resource instead of the sidelink resource based at least in part on receiving the indication.

8. The apparatus of claim 7, wherein the different sidelink resource is selected by the UE.

9. The apparatus of claim 1, wherein the communication by the UE comprises:
   a unicast transmission,
   a broadcast transmission, or
   a groupcast transmission.

10. The apparatus of claim 1, wherein the indication is carried in a first stage sidelink control information (SCI) transmission on a physical sidelink control channel (PSCCH).

11. The apparatus of claim 10, wherein the indication is indicated explicitly using at least one bit in the first stage SCI transmission.

12. The apparatus of claim 1, wherein the indication is implied by an additional reservation, by the transmitter UE, of the sidelink resource for the communication by the transmitter UE, wherein the additional reservation indicates that the communication by the transmitter UE has a priority that is higher than a priority of the communication by the UE.

13. The apparatus of claim 1, wherein the indication is carried in a medium access control (MAC) control element.

14. The apparatus of claim 1, wherein the indication is carried in a dedicated second stage sidelink control information format.

15. The apparatus of claim 1, wherein the sequence is the same as a physical sidelink feedback channel sequence.

16. The apparatus of claim 1, wherein the sequence is generated based at least in part on a source identifier of the UE.

17. The apparatus of claim 1, wherein the sequence is transmitted based at least in part on a source identifier of the UE.

18. The apparatus of claim 1, wherein the sequence is carried on a single resource.

19. The apparatus of claim 18, wherein the single resource comprises a physical sidelink feedback channel resource.

20. The apparatus of claim 1, wherein the indication is carried using one or more physical sidelink feedback channel (PSFCH) resources.

21. The apparatus of claim 20, wherein the one or more PSFCH resources are unused for feedback.

22. An apparatus for wireless communication at a user equipment (UE), comprising:
    one or more memories; and
    one or more processors, based at least in part on information stored in the one or more memories, configured to:
    receive, from a first transmitter UE, a reservation for a sidelink resource for a communication by the first transmitter UE, wherein the sidelink resource was previously reserved by a second transmitter UE for a communication by the second transmitter UE; and
    transmit, to the first transmitter UE, an indication that the sidelink resource is reserved and that the first transmitter UE is not permitted to reserve the sidelink resource, wherein the indication comprises a sequence.

23. The apparatus of claim 22, wherein the one or more processors, to transmit the indication, are configured to cause the UE to transmit the indication based at least in part on a determination that the first transmitter UE is not permitted to pre-empt the communication by the second transmitter UE.

24. The apparatus of claim 23, wherein the determination that the first transmitter UE is not permitted to pre-empt the communication by the second transmitter UE is based at least in part on a priority of the communication by the second transmitter UE, wherein the priority of the communication by the second transmitter UE is higher than, or the same as, a priority of the communication by the first transmitter UE.

25. The apparatus of claim 22, wherein the UE comprises the second transmitter UE.

26. The apparatus of claim 22, wherein the UE comprises a receiver UE, wherein the receiver UE comprises:
- an intended receiver of the communication by the first transmitter UE,
- an intended receiver of the communication by the second transmitter UE, or
- a combination thereof.

27. The apparatus of claim 22, wherein the UE comprises the second transmitter UE, and wherein the indication comprises an additional reservation of the sidelink resource for the communication by the second transmitter UE, wherein the communication by the second transmitter UE has a priority that is higher than a priority of the communication by the first transmitter UE.

28. A method of wireless communication performed by a user equipment (UE), comprising:
- transmitting, to a receiver UE, a reservation for a sidelink resource for a communication by the UE, wherein the sidelink resource was previously reserved by a transmitter UE for a communication by the transmitter UE; and
- receiving, from the receiver UE, an indication that the sidelink resource is reserved and that the UE is not permitted to reserve the sidelink resource, wherein the indication comprises a sequence.

29. A method of wireless communication performed by a user equipment (UE), comprising:
- receiving, from a first transmitter UE, a reservation for a sidelink resource for a communication by the first transmitter UE, wherein the sidelink resource was previously reserved by a second transmitter UE for a communication by the second transmitter UE; and
- transmitting, to the first transmitter UE, an indication that the sidelink resource is reserved and that the first transmitter UE is not permitted to reserve the sidelink resource, wherein the indication comprises a sequence.

* * * * *